(12) United States Patent
Vuillamy et al.

(10) Patent No.: US 6,572,030 B2
(45) Date of Patent: Jun. 3, 2003

(54) DEVICE FOR DISPLACING TO NOZZLE OUTLET OR ELIMINATING JET SEPARATION IN ROCKET ENGINE NOZZLES, AND A NOZZLE INCLUDING THE DEVICE

(75) Inventors: Didier Vuillamy, Quincampoix (FR); Jean-Claude Harlay, Port-Mort (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 09/990,603

(22) Filed: Nov. 21, 2001

(65) Prior Publication Data

US 2002/0059800 A1 May 23, 2002

(30) Foreign Application Priority Data

Nov. 22, 2000 (FR) .............................................. 00 15057

(51) Int. Cl.⁷ .............................................. B64D 33/04
(52) U.S. Cl. ..................................... 239/265.11; 60/770
(58) Field of Search ......................... 60/770; 239/265.4, 239/265.19

(56) References Cited

U.S. PATENT DOCUMENTS

| | | | |
|---|---|---|---|
| 3,237,402 A | | 3/1966 | Steverding |
| 3,469,787 A | | 9/1969 | Marsh et al. |
| 3,925,982 A | * | 12/1975 | Mueller ........................ 60/242 |
| 5,450,720 A | * | 9/1995 | Vuillamy et al. ............. 60/271 |
| 5,481,870 A | * | 1/1996 | Pacou et al. .................. 60/266 |
| 5,490,629 A | * | 2/1996 | Bonniot et al. ......... 239/265.15 |
| 5,779,151 A | | 7/1998 | Sutton |
| 5,894,723 A | * | 4/1999 | Gastal .......................... 60/271 |

FOREIGN PATENT DOCUMENTS

| | | |
|---|---|---|
| DE | 10 19 867 | 11/1957 |
| FR | 808 969 | 2/1937 |
| FR | 2 602 275 | 2/1988 |

* cited by examiner

*Primary Examiner*—Charles G. Freay
*Assistant Examiner*—John F Belena
(74) *Attorney, Agent, or Firm*—Weingarten, Schurgin, Gagnebin & Lebovici LLP

(57) ABSTRACT

To control the separation of a hot gas ejection jet within a rocket engine nozzle, the device includes a jettisonable annular structure for placing around the outside wall of the nozzle at the gas outlet section thereof, which structure defines a radial extension around the nozzle so that in the presence of an outlet jet coming from the nozzle, it creates a low pressure zone in the vicinity of the bottom face of the device, thereby displacing in the gas outlet direction jet separation from the interior wall of the nozzle.

16 Claims, 4 Drawing Sheets

DEVICE FOR DISPLACING TO NOZZLE OUTLET OR ELIMINATING JET SEPARATION IN ROCKET ENGINE NOZZLES, AND A NOZZLE INCLUDING THE DEVICE

FIELD OF THE INVENTION

The invention relates to a device for controlling jet separation for rocket engine nozzles having a large section ratio and intended for operation under conditions of varying pressure.

PRIOR ART

To obtain high specific impulse at altitude, rocket engines are fitted with nozzles having a large section ratio. For a given engine, as it rises through the atmosphere, ambient pressure drops off, passing from atmospheric pressure at sea level to a low pressure that is a function of altitude. Nozzles are generally optimized as a function of the overall performance of a launcher, which leads to using nozzles that are overexpanded so as to provide maximum thrust at a "matched" altitude. Consequently, at atmospheric pressure as it exists at sea level, the expansion of gases in the nozzle is limited by the phenomenon of the jet separating from the wall of the diverging portion of the nozzle.

That phenomenon exists throughout an initial stage of flight that starts at liftoff and continues up to the matched altitude, which can be situated at about ten kilometers above the ground, for example, at which altitude thrust reaches its maximum because the static pressure Pe of the gases in the outlet section of the nozzle is then equal to ambient pressure Pa which is relatively low. Throughout this initial stage of flight, the static pressure of the gases in the outlet section of the nozzle is well below ambient pressure, thus leading to the phenomenon of the jet separating inside the nozzle, which phenomenon disappears at the matched altitude. During this initial stage, this phenomenon limits the expansion ratio of the gases, i.e. the ratio between the pressure P0 in the combustion chamber and the static pressure Pe of the gases in the outlet section of the nozzle.

A drawback of the jet separating inside the nozzle is to create mechanical forces in the separation zones that are harmful to the structure of the diverging portion.

To limit the effects due to the jet separating, various types of solution have already been proposed.

A first type of solution consists in fitting rocket engines with deployable nozzle systems. Documents U.S. Pat. No. 4,489,889, U.S. Pat. No. 4,779,799, and U.S. Pat. No. 4,676,436 describe relatively complicated nozzle systems which make it possible during flight to match the outlet section and the length of the nozzle as a function of pressure conditions. The systems described in those documents were developed for use with missiles or upper stage engines which present operating characteristics and dimensions that are different from those of main rocket engines. Those fragile and bulky systems are not designed to be jettisoned at the matched altitude and they are therefore difficult to apply to the main thrust nozzles of a rocket.

A second type of solution consists in proposing nozzles that comprise a system of ejectable elements, such as that described in document FR-A-2 503 794 which shows a nozzle having a plurality of diverging portions of increasing size nested one within another and jettisoned in succession as a function of altitude. Nevertheless, such a system is complex and runs the risk of damaging the diverging portions as successive parts are jettisoned. Furthermore, sealing between the ejectable diverging portions is a major problem since the gases tend to filter between said elements and to damage them on their outside faces which are not designed to be subjected to hot gases.

Another document, FR-A-2 705 739 proposes an ejectable device for reducing the outlet section of a nozzle in order to confine the jet inside the nozzle and thus limit axial fluctuations in the position of the line of separation. A difficulty encountered by that device is the thermal behavior of the ejectable element, which is not provided with cooling and which is subjected to temperatures close to those of the gases in the combustion chamber, i.e. about 3000 kelvins (K). It is therefore necessary to provide for injection of a low-temperature fluid into the separation zone inside the diverging portion in order to reduce the amount of heat received by the wall. That leads to problems of fluid consumption and of reliability in operation.

Another type of solution concerns nozzles fitted with air admission systems which, as disclosed in document U.S. Pat. No. 5,683,033, enable separation to be stabilized and enable the drag of the diverging portion to be reduced. That system is constituted by multiple moving elements (e.g. valves) difficult to make reliable in operation in the sound and vibration environment of a rocket engine. Furthermore, like the system described in document U.S. Pat. No. 5,450,720 which shows a nozzle in which separation is controlled by admitting ambient air through large longitudinal slots formed in the wall of the nozzle, that system of U.S. Pat. No. 5,683,033 for admitting ambient air suffers from the risk of additional combustion of the gases coming from the nozzle, with the consequence of heating taking place at the wall of the diverging portion, thereby likewise requiring special thermal protection.

The problem of jet separation in the nozzle can also be countered by devices for injecting gas at various heights within the diverging portion serving to fix the line of separation and make it regular. That kind of device is described in particular in documents U.S. Pat. No. 3,925,982, and FR-A-2,628,488. Those fluid injection devices nevertheless require complex valve and control equipment for controlling flow rate, which leads to a considerable increase in the weight of the diverging portion of the nozzle. Furthermore, since those devices consume fluid, they are of use only when a gas is available at low cost and of little use otherwise, i.e. only with bypass flow engines.

As disclosed in document FR-A-2,639,404, that solution consists in controlling separation in a nozzle having a large section ratio by the presence of a fluid barrier implemented at the end of the diverging portion. That device is effective, but it requires gas to be consumed whose expansion could have been used more usefully either in the main nozzle of a full flow engine, or else in nozzles having a larger section ratio for a bypass flow engine. In addition, that equipment is expensive, is necessarily heavy because of the presence of valves, and installing it at the bottom end of a nozzle gives rise to a large amount of nozzle inertia that is detrimental to the strength of the thrust chamber.

OBJECT AND BRIEF SUMMARY OF THE INVENTION

The invention seeks to remedy the above drawbacks and to provide a device enabling jet separation in a nozzle to be eliminated or reduced. The invention seeks to reduce and control the phenomenon of jet separation by means of a device which is passive and does not consume fluid, whether for cooling purposes or for jet control purposes, and which presents structure that is static, thereby guaranteeing that the device is simple and reliable.

These objects are achieved by a device for controlling jet separation inside a rocket engine nozzle, the device comprising a jettisonable annular structure for placing around the outside wall of the nozzle level with the gas outlet section thereof, said structure defining a radial extension around the nozzle so that in the presence of an outlet jet from the nozzle it creates a low pressure zone in the vicinity of the bottom face of the device, thereby reducing jet separation inside the nozzle.

The invention thus provides a device for controlling jet separation which is simple and effective and which can be applied to any rocket engine, whatever the cycle it uses, and which by virtue of its design can be installed while requiring only minor modifications to the structure of the diverging portion. The device presents the advantage of not weakening diverging portions, and on the contrary it serves to provide mechanical reinforcement for the bottom end of the device of the diverging portion, thereby limiting the harmful effects of the large amounts of deformation that appear, in particular while engines are starting or stopping. The device does not degrade engine performance. In addition, since it is external to the diverging portion, it is not subjected to the thermal stresses to which all other devices presenting surfaces in contact with the jet are exposed, and as a result it does not require any gas to be tapped for the purpose of its own cooling.

According to an aspect of the present invention, the annular structure is substantially frustoconical in shape sloping outwards and downwards.

The effect of creating a low pressure zone on the bottom face of the device is thereby increased.

More particularly, the annular structures presents a profile with curvature that forms an angle with a plane perpendicular to the axis of the nozzle which lies in the range 10° to 20°.

In an embodiment of the invention, the bottom face of the annular structure has steps for braking the flow of air along said face.

In which case, the extent to which the flow of air is slowed down over the bottom face of the device is further increased.

The annular structure can present an inside diameter that is slightly greater than the outside diameter of the outlet section of the nozzle, thereby leaving clearance enabling the nozzle to move relative to the annular structure under the effect of thermal expansion.

The annular structure is constituted by a set of angular sectors assembled together via contact surfaces which ensure that they move as a whole, the device further comprising means for holding the assembled-together sectors around the nozzle.

Such a structure for the device enables the annular structure to be jettisoned without any risk of damaging the diverging portion of the nozzle.

More particularly, the means for holding the sectors around the nozzle comprise a first cable surrounding the sector assembly in the vicinity of its inner periphery, and a second cable surrounding the sector assembly in the vicinity of its outer periphery, each of said first and second cables being connected to respective first and second tensioning members, thereby forming two sector-clamping loops, said tensioning members also comprising means for rupturing said cables.

The two cables exert radial forces on each sector, which forces are taken up by lateral forces serving to stiffen and reinforce the annular structure around the nozzle while still allowing it to be ejected when the time has come.

The contact surfaces between the sectors include portions which project upwards from the top faces of said sectors.

The risks of a sector buckling under contact pressure is thus avoided.

In the event of slip between the sectors being detected, the contact surfaces of the sectors can comprise alternating grooves and tongues for receiving or engaging respective tongues or grooves on the contact surfaces of adjacent sectors.

The grooves can advantageously contain respective elastomer gaskets for avoiding leaks between the sectors.

In a particular aspect of the invention, at least two sectors of the annular structure are smaller in size than the other sectors, the smaller-sized sectors being disposed uniformly in the annular structure.

Jet separation in the nozzle is then controlled by avoiding the appearance of disorganized separation zones which are dangerous for the structure of the diverging portion.

Jet separation in the nozzle can also be imposed with at least two sectors of the annular structure being perforated over their respective surfaces, the perforated sectors being disposed uniformly within the annular structure.

Controlled separation of the jet then enables the nozzle to be appropriately dimensioned.

The invention also provides a rocket engine nozzle including a jet separation control device as defined above.

More specifically, the nozzle comprises a substantially plane outwardly-directed rim of diameter greater than the diameter of the inside periphery of the device so as to form a support for said device.

This is the minor modification that needs to be made to a rocket engine nozzle so as to enable it to be used with the device of the invention.

More precisely, the rim extends radially from the outlet section of the nozzle over a distance of the order of 5 centimeters (cm) to 8 cm.

In accordance with an aspect of the invention, the outlet section of the nozzle with the rim is covered on its outside surface in a material that is deformable.

In this way, any leaks between the device and the outside wall of the nozzle can be limited.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF EMBODIMENTS OF THE INVENTION

Figure 1:
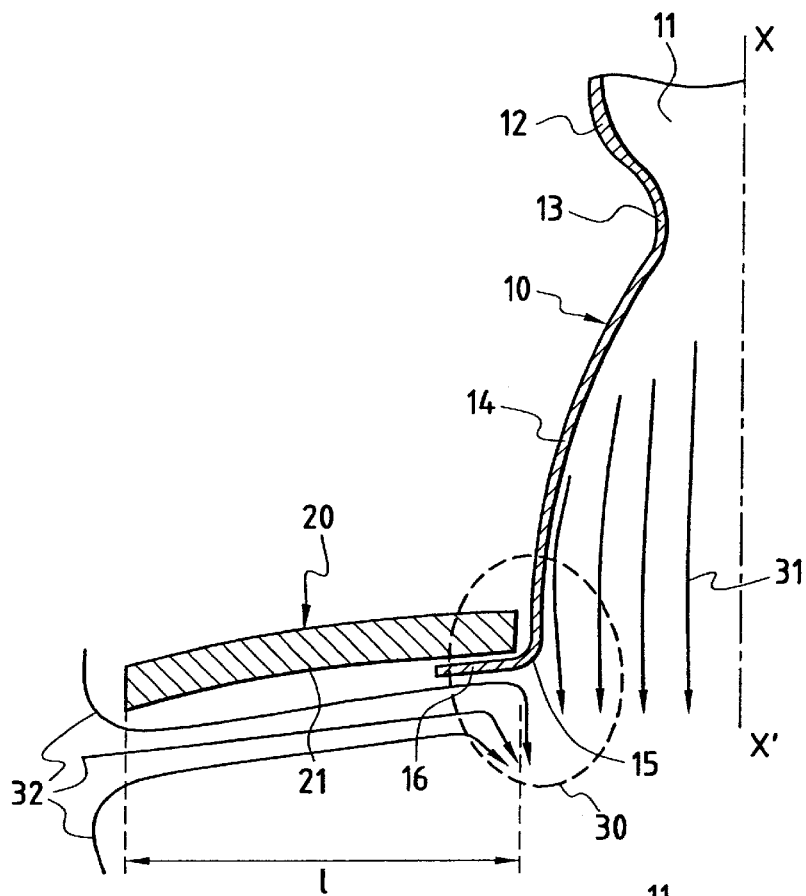
FIG. 1 is a diagrammatic axial half-section view of a portion of a nozzle fitted with a radial extension device of the invention, showing how it operates.

FIG. 1 is a general section view of a rocket engine nozzle 10 for operation with a device of the present invention. The nozzle 10 comprises an upstream converging portion 12 receiving the hot gases produced in a combustion chamber 11, a nozzle throat 13 of section area Sc, and a diverging portion 14 which expands the hot gases downstream from the throat 13 and ejects them from the downstream end 15 of the diverging portion which defines a nozzle outlet section of area Se.

When seeking to optimize rocket engine nozzles to create a high ejection speed for the hot gases produced in the chamber, it is necessary in particular to expand the gases as much as possible in the nozzle by adopting for this purpose a large ratio for the section defined by the outlet section area Se over the section area of the throat Sc. As already mentioned, for a given thruster operating at a given rate, a nozzle can be matched only for a single altitude which is generally situated at a height of several kilometers above the ground. Consequently, if the nozzle is matched for operation at high altitude where ambient pressure is relatively low, then the nozzle is overexpanded at ground level where the static pressure of the gases in the outlet section of the nozzle is well below ambient pressure Pa which is then equal to 1 bar, and as a result in traditional diverging portions, a phenomenon occurs whereby the hot gas jet separates from the inside wall of the diverging portion.

More generally, in this type of nozzle, from atmospheric pressure at ground level up to the ambient pressure that exists at the matched altitude, gas expansion is limited by the phenomenon of the gas jet separating from the inside wall of the diverging portion. Furthermore, this jet separation phenomenon can lead to a diverging portion being destroyed because of the asymmetries and instabilities that it can produce.

That is why proposals have already been made in the prior art for a large number of solutions that seek to limit the phenomenon of gas separation in a nozzle. Nevertheless, regardless of whether such systems rely on deployable nozzles, on ejectable elements, on admitting ambient air, or on injecting fluid, none of them provides a solution that is both low in cost and simple for reducing separation while simultaneously avoiding weakening the diverging portion, degrading the performance of the engine, fluid consumption, and risks associated with jettisoning.

The operation of the device of the invention is explained with reference to FIG. 1 which is a general section view of the nozzle 10 of a rocket engine fitted with a device of the present invention for controlling jet separation.

The device consists in a circular ring 20 which forms a radial extension of length l at the end of the nozzle, possibly at a small angle of inclination, thus conferring a perceptibly frustoconical shape on the ring. When the rocket engine starts operating, the main jet from the nozzle 10 as represented by arrows 31 has a high ejection speed and thus entrains a fraction of the ambient air in a direction represented by arrows 32 terminating in a zone 30 referred to as the mixing zone 30. This entrainment induces a flow for renewing the entrained air, which effect is impeded by the presence of the ring 20. As a result, a low pressure zone is generated under the bottom face 21 of the ring, thereby artificially creating pressure conditions at the outlet from the nozzle that are similar to those that exist at high altitude. For example, pressures of the order of 0.7 bar to 0.8 bar can be obtained when ambient pressure is 1 bar. These reduced pressure values obtained at the gas outlet section by means of the circular ring of the invention correspond to values at which the jet adheres to the inside wall of the nozzle. Thus, the separation of the jet which would have been located well inside the diverging portion of the nozzle in the absence of the device is now displace towards the outlet of the nozzle, or is even eliminated.

The ring constituting the device for controlling jet separation inside the nozzle produces the desired effect by constituting a radial extension at the end of the nozzle. Thus, for example, for a "Vulcain" type nozzle having an outlet radius of about 1 meter (m), a radial extension l of about 50 cm suffices. Nevertheless, even for an engine of the "SSME" type that produces greater thrust, the dimensions required of the ring are not greatly modified. For nozzles that are for use only in testing on the ground and for which size is not a constraint, the radial extension can be extended to twice that size.

Figure 2:
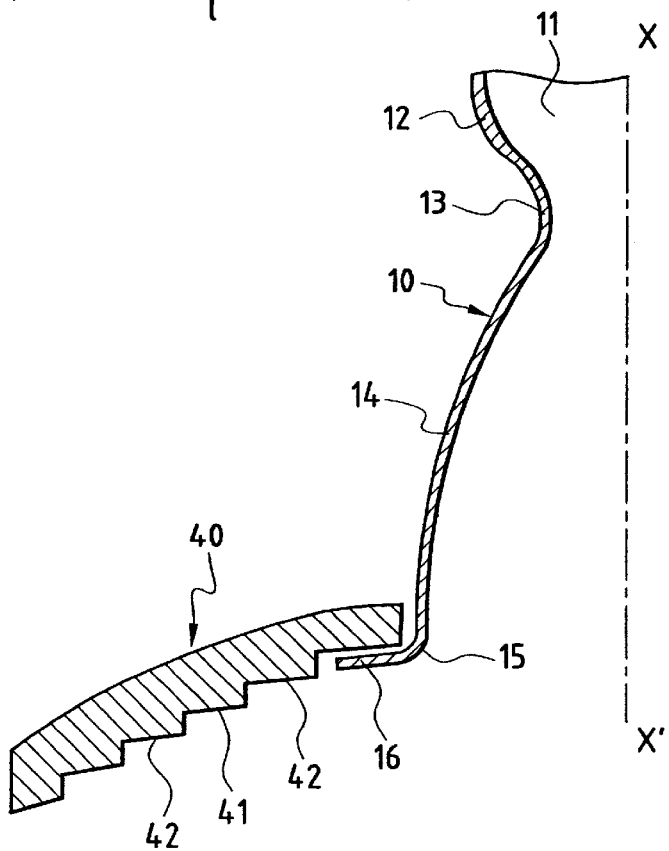
FIG. 2 is a diagrammatic axial half-section view of a portion of a nozzle fitted with a radial extension device constituting an embodiment of the invention.

Physical common sense indicates that the greater the size l of the ring, the greater the looked-for effect. Nevertheless, when considering criteria such as weight and bulk, which are of great importance in rocket engine applications, it is necessary to optimize the shape and size of the ring so as to maximize the suction it generates. Thus, FIG. 2 shows an embodiment of the device of the invention which is constituted by a ring 40 having steps 42 on its bottom face 41 forming a kind of baffle for braking the flow of air along this face.

Figure 3:
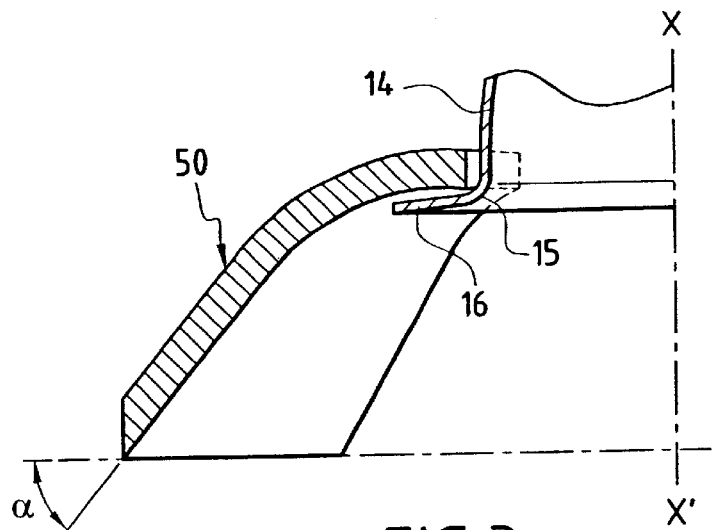
FIG. 3 is a diagrammatic axial half-section view of a portion of a nozzle fitted with a radial extension device constituting another embodiment of the invention.

FIG. 3 shows another embodiment of the device which is in the form of a ring 50 whose curved shape alone ensures the desired level of suction. By way of example, for a nozzle having a radius of about 1 m, the ring 50 can form an angle α relative to a plane perpendicular to the axis XX' of the nozzle such that α lies in the range 10° to 20°.

Figure 4:
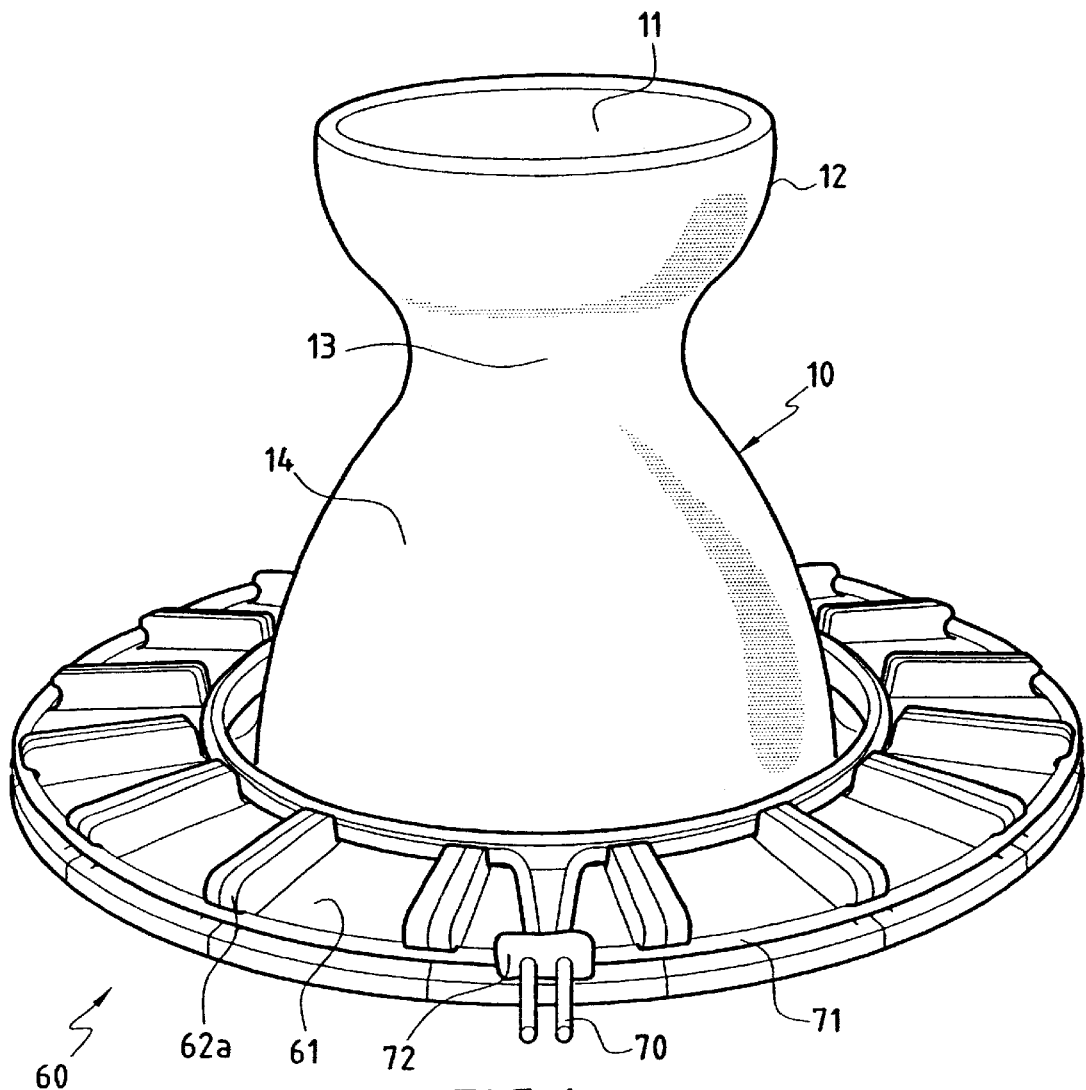
FIG. 4 is a perspective view showing an example of a radial extension device made up of a plurality of elements assembled together around a nozzle.

In order to be able to jettison the ring at the matched altitude and also in order to make the ring easy to mount on the nozzle, the device can be built up from a plurality of angular sectors, as shown in FIG. 4. In this figure, the nozzle 10 is fitted at its end with a ring 60 comprising a plurality of angular sectors 61 disposed side by side and held together around the nozzle by first and second cables 70 and 71 disposed on the top face of each sector. Each of the two cables co-operates with a tensioning and unlocking system specific thereto which can be constituted, for example as shown for the cable 70, by a member 72 for controlled guidance and tensioning. These members can be positioned either on the ring 60, or on the outside wall of the diverging portion. The two cables then act as bands which hold the sectors relative to one another in the ring configuration so as to form the jettisonable radial extension of the present invention. The ring is mounted by putting the sectors into place successively using a temporary support tool, and then by putting the cables into place on the assembled ring and tightening them to the desired extent.

Each system for tensioning and releasing the cables also includes cable-rupturing means that can be of pyrotechnical, pneumatic, or electrical nature. For example, it is possible to use explosive bolts on the members for guiding and tensioning the cables. The angular sectors are then jettisoned by rupturing the cables, beginning with the first cable 70 which is situated closer to the nozzle.

Figure 5:
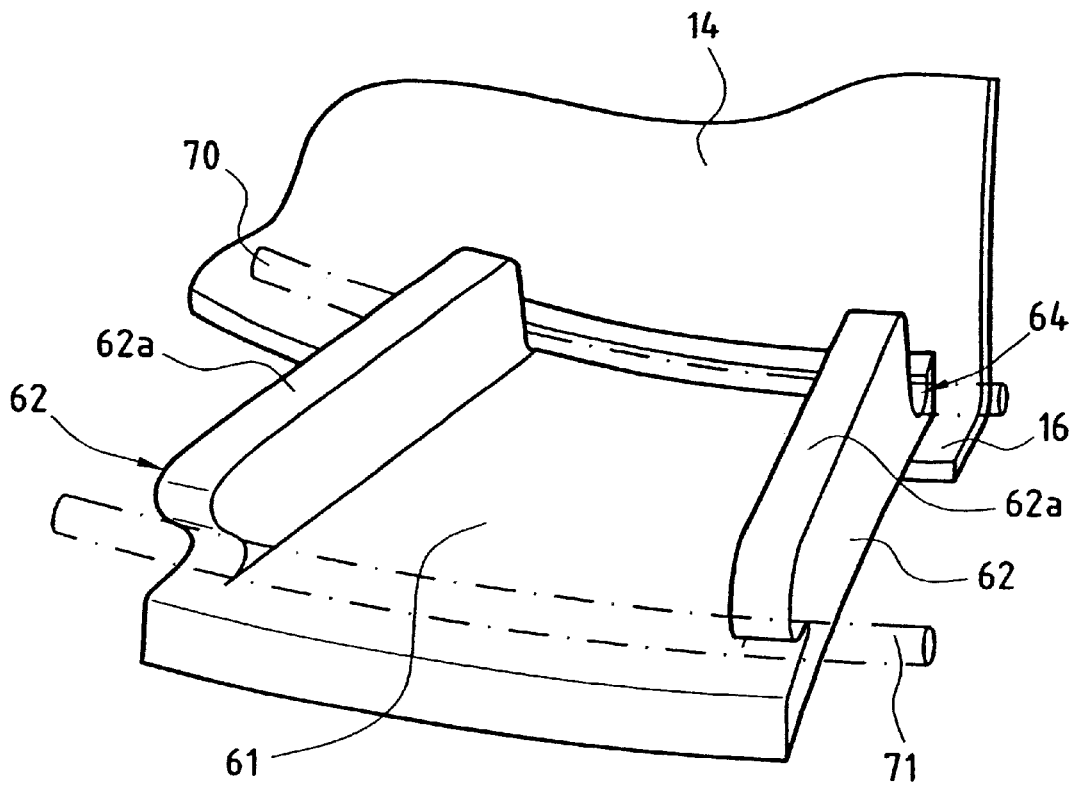
FIG. 5 is a perspective view showing an example of an angular sector constituting a portion of the radial extension device of the invention.

As shown in FIG. 5, each sector 61 is of a shape that expands from its portion closest to the nozzle to an end portion so that once the sectors have been assembled together side by side they form the annular structure 60. The bottom faces of the sectors 61 are of a shape which is a function of the shape required for the bottom face of the ring that is to be obtained. In particular, the sectors can have bottom faces 63 that are curved in an axial plane as shown in FIG. 6A so as to define a ring configuration of the kind shown in FIG. 3, or they can have steps so as to obtain the ring configuration as shown in FIG. 2.

In order to be able to withstand high contact pressures, each sector comprises on its side surfaces 62 that are to come into contact with adjacent sectors, respective portions 62a that are raised relative to the top face of the sector. The shape of the raised portions 62a is also adapted so as to enable the first and second holding cables 70 and 71 to be put into place on either side of the portions 62a. More precisely, the first cable 70 closer to the nozzle is placed in a setback 64 formed in the thickness of the panel in front of the raised portions 62a. The same applies to the second cable 71 which is placed in a setback formed in the thickness of the panel behind the raised portions 62a.

Figure 6A:
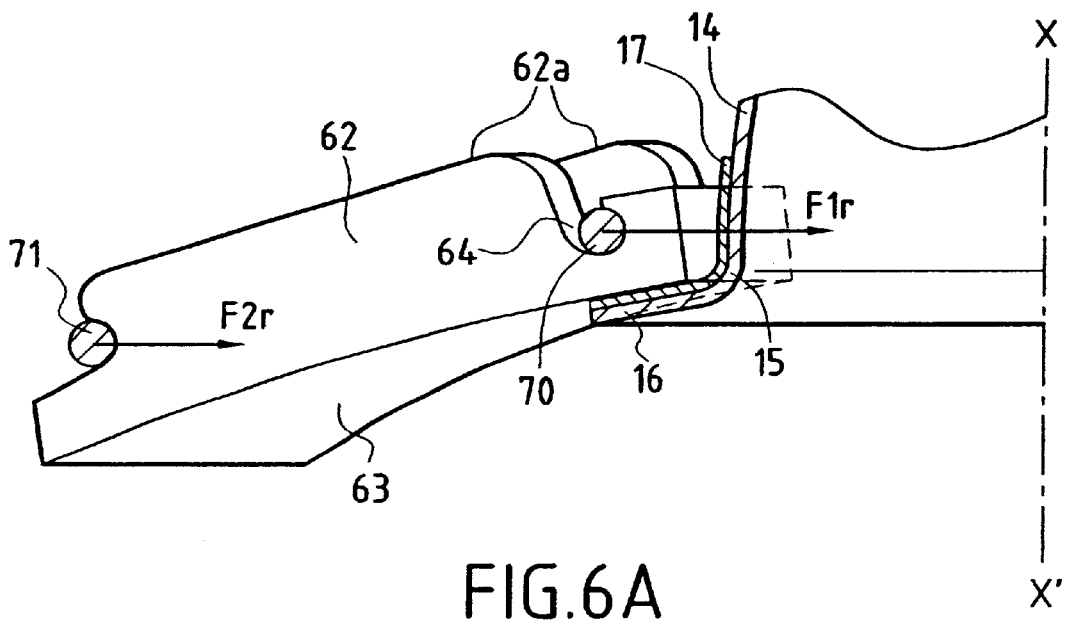
FIGS. 6A and 6B are respectively an axial half-section view and a diagrammatic plan view showing how the mechanical balancing and holding means act on each sector.
Figure 6B:
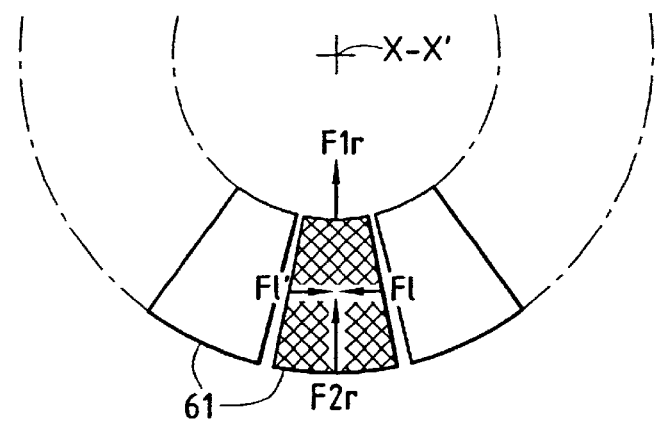

FIGS. 6A and 6B show the action of the cables 70 and 71 and how each sector is in mechanical equilibrium. In FIG. 6A, the cables 70 and 71 exert respective forces F1r and F2r in a plane whose normal extends along the axis X–X' of the nozzle. As shown in FIG. 6A, these forces are not necessarily situated in the same plane. The orientation of the forces E1r and E2r depends on the shape of the sectors.

In FIG. 6B, it can be seen that the forces E1r and E2r exerted by the cables on a sectors are taken up by lateral forces F1 and F1' exerted by each adjacent sector on the respective lateral contact surfaces. In order to be able to exert strong contact forces E1r and E2r between the sectors and in order to prevent the sectors from buckling, it is preferable to increase the lateral contact areas by using raised portions 62a as described above. In addition, the couples produced by the two cables, which are not necessarily in the same plane, can easily be taken up by having sectors with this kind of shape.

A wide range of materials can be used for making the angular sectors 61. The device made up of sectors does not lie on the outlet path of the jet from the nozzle so it is not subjected to the high temperatures which are generated by the ejected gases, and as a result there is no need to use special materials that withstand very high temperatures and that are therefore relatively expensive. The sectors can thus be made out of composite materials, steel sheet, or carbon fiber, depending on the weight/performance compromise that is to be obtained. By way of example, for sectors 61 made of composite material, the thickness of a sector will lie in the range 50 millimeters (mm) to 20 mm; the height of the raised portions 62a will lie in the range 80 mm to 150 mm (including a thickness of the sector), and the width of a sector will be 40 mm.

Figure 7:
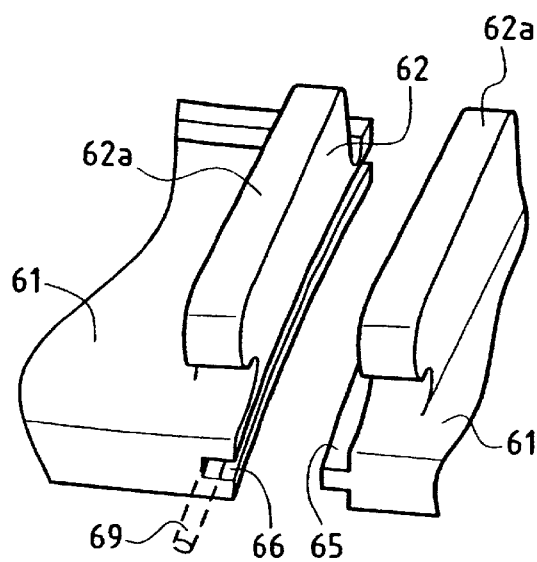
FIG. 7 is a detail view showing an example of how angular sectors are assembled together to constitute the radial extension device.

If slip is detected between the sectors, then it is possible to provide a groove 66 and a tongue 65 on respective ones of the lateral faces 62 of each sector, as shown in FIG. 7.

Thus, two adjacent sectors are united by the tongue 67 on one sector being received in the groove 66 of the adjacent sector.

In order to optimize the operation of the device of the invention, it is possible to provide additional means on the device and on the nozzle to avoid any leakage. Such leaks can occur between the sectors forming the ring under the effect of the pressure difference that exists between the two faces of the panels (top face and bottom face). This type of leak between the sectors can be limited by placing respective gaskets (e.g. elastomer gaskets) in the grooves 66 of the sectors as shown in FIG. 7. Such gaskets do not require any special ability to withstand high temperatures since they are not subjected to high temperatures. They are compressed when the holding cables are tightened. In addition, putting them in the grooves protects them from any back flow of hot gas in the event of the engine stopping. They will therefore require to be replaced infrequently if they are used with an engine during testing on the ground.

For leaks which might occur between the structure of the ring of the device and the outside wall of the diverging portion of the nozzle, the rim 16 present at the end 15 of the nozzle 10 and projecting outwards in order to form a support for the device can be covered in a deformable material 17 of the rubber or elastomer type. This material 17 can be a material liable to melt under the increasing temperature of the nozzle wall, thereby providing better sealing. Under such circumstances, the material will need to be replaced after each occasion on which the engine is run.

In this example, for a "Vulcain" type engine, it is estimated that the mass flow rate of entrained air is about 13 kilograms per second (kg/s). Assuming that the system can tolerate on admission one-tenth or two-tenths of this flow rate coming through leaks, it is found that the total section of the leakage paths must not be greater than a disk having a diameter of 10 cm to 12 cm.

While a rocket engine is in operation, the high temperatures present in the nozzle can cause the material of the nozzle to expand. Consequently, when dimensioning the ring, provision can be made for its inside circumference to be slightly greater than the outside circumference of the end 15 of the nozzle around which it is placed so as to leave room for the nozzle to expand within normal limits due to thermal expansion. This movement is made easier by having a plane contact face between the ring and the rim 16 which acts as a support for the ring. Still with reference to the example of a "Vulcain" engine, if it is assumed that the nozzle is made of a material having a thermal coefficient expansion of $10^{-5}$, then for a nozzle having an outlet radius of 1 m, the change in radius will be 1 cm for a change in temperature of 1000 K.

Figure 8:
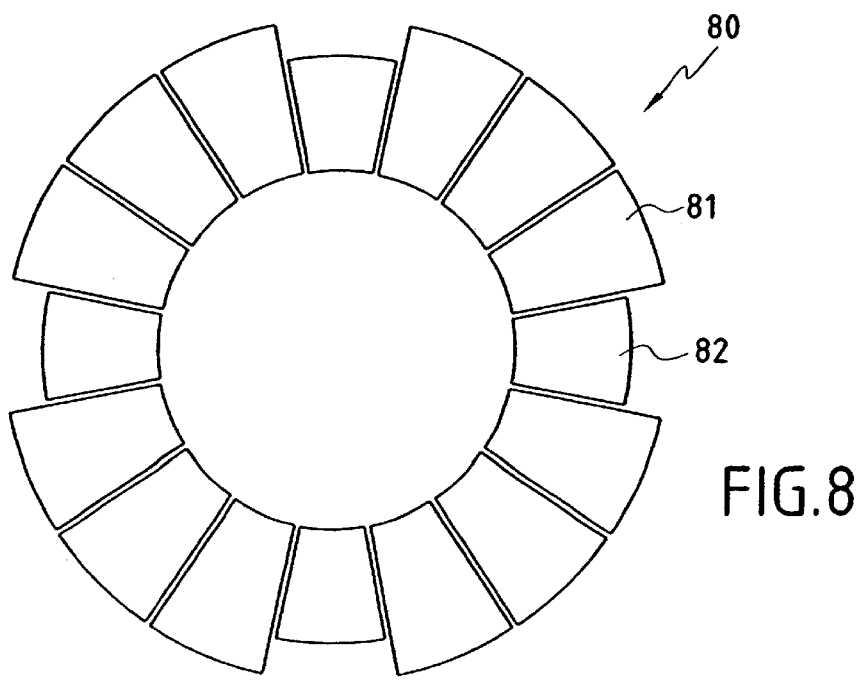
FIG. 8 is a diagrammatic view of an embodiment of the radial extension device with imposed separation constituting an embodiment of the invention.

The embodiments of the device of the invention as described above are intended to limit or eliminate jet separation inside the nozzle. Nevertheless, the shape of the ring constituting the device can be adapted so that the pressure field around its periphery is distributed in periodic manner. This can be done, for example, by placing sectors of different shape or size at regular intervals. FIG. 8 shows an example of a device comprising a ring 80 made up of four sectors 82 of size that is smaller than that of the other sectors 81. The smaller sectors 82 are uniformly distributed around the ring, thus causing the jet to separate and form four lobes inside the diverging portion. In this type of embodiment of the device using sectors of different sizes, the way in which the sectors are connected together needs to be adapted accordingly.

Alternatively, it is possible to make a ring which likewise enables the jet to become separated in an imposed manner while using sectors that all have the same mechanical interface but some of which perform differently from the majority of the sectors because they have a different shape. For example, it is possible to use sectors which differ from the others by having a large hole formed through their thickness so as to allow ambient air to penetrate easily towards the bottom of the diverging portion, thereby causing greater separations to occur in the corresponding regions. The sizes of the sectors or of the perforations for imposing particular separation of the jet are functions of the separation effect that is to be obtained.

Consequently, since the way in which the jet separates is controlled by the special structure of the ring to ensure that the lobes obtained in this way are distributed uniformly and symmetrically, phenomena of asymmetry and of instability are avoided. Controlled separation enables the nozzle to be dimensioned for jet separation without running the danger of the diverging portion being destroyed and while ensuring that the engine can deliver stable amounts of thrust.

What is claimed is:

1. A device for controlling jet separation inside a rocket engine nozzle, the device comprising a jettisonable annular structure placed around an outside wall of the nozzle at a downstream end of said nozzle, said structure defining an outward radial extension around the nozzle so that a fluid exhaust jet from inside the nozzle, working in relation to the structure creates a lower pressure zone than ambient pressure zone under said structure in the vicinity of the downstream end of said nozzle, thereby displacing in a gas outlet direction jet separation from an interior wall of the nozzle.

2. The device according to claim 1, wherein the annular structure extends radially outward in a broadly convex shape.

3. The device according to claim 1, wherein a bottom face of the annular structure has steps to break the flow of air along said face.

4. The device according to claim 1, wherein the annular structure has a curved profile in a meridian plane of the nozzle, said curved profile forming an angle lying in the range 10° to 20° with respect to a plane perpendicular to an axis of the nozzle.

5. The device according to claim 1, wherein the annular structure presents an inner wall diameter that is in proximity but greater than an outer wall diameter of an outlet wall section of the nozzle.

6. The device according to claim 1, wherein the annular structure is constituted by a set of angular sectors assembled to one another via contact surfaces which prevent them from moving relative to one another, said device also comprising means for holding said assembly of sectors around the nozzle.

7. The device according to claim 6, wherein the means for holding the sectors around the nozzle comprise a first cable surrounding the sector assembly in the vicinity of its inner periphery, and a second cable surrounding the sector assembly in the vicinity of its outer periphery, each of said first and second cables being connected to respective first and second tensioning members, thereby forming two sector-clamping loops, said tensioning members also including means for rupturing said cables.

8. The device according to claim 6, wherein the contact surfaces of the sectors include portions which are raised above top faces of said sectors.

9. The device according to claim 6, wherein the contact surfaces of the sectors comprise in alternation a groove and a tongue for receiving or engaging the tongue or the groove respectively of the contact surface of the adjacent sector.

10. The device according to claim 9, wherein said grooves contain respective gaskets of elastomer type.

11. The device according to claim 6, wherein at least two sectors of the annular structure are of a radial extension that is smaller than radial extension of the other sectors, said at least two smaller sectors being opposite diametrically in the annular structure.

12. The device according to claim 6, wherein at least two sectors of the annular structure have a perforated surface, said at least two perforated sectors being opposite diametrically within the annular structure.

13. A rocket engine nozzle, including a device for controlling jet separation according to claim 1.

14. The nozzle according to claim 13, including a substantially planar outwardly-directed rim at its outlet section having a diameter greater than a diameter of an inner periphery of the device so as to form a support for said device.

15. The nozzle according to claim 14, wherein the rim extends radially relative to the outlet section off the nozzle over a distance of the order of 5 cm to 8 cm.

16. The nozzle according to claim 14, wherein the outlet section of the nozzle comprising the rim is covered on its outside surface in a deformable material.

* * * * *

UNITED STATES PATENT AND TRADEMARK OFFICE
CERTIFICATE OF CORRECTION

PATENT NO. : 6,572,030 B2
DATED : June 3, 2003
INVENTOR(S) : Didier Vuillamy et al.

It is certified that error appears in the above-identified patent and that said Letters Patent is hereby corrected as shown below:

<u>Title page,</u>
Item [57], ABSTRACT,
Line 4, "cutlet" should read -- outlet --;

<u>Column 6,</u>
Lines 26 and 34, "1" should read -- $\ell$ --;

<u>Column 7,</u>
Lines 37, 38 and 42, "E1r and E2r" should read -- F1r and F2r --; and <u>Column 10,</u>
Line 42, "off the nozzle" should read -- of the nozzle --.

Signed and Sealed this

Twentieth Day of July, 2004

JON W. DUDAS
*Acting Director of the United States Patent and Trademark Office*